(12) United States Patent
Smed

(10) Patent No.: US 11,454,361 B2
(45) Date of Patent: Sep. 27, 2022

(54) AUTOMATICALLY ADJUSTING TASK LIGHT

(76) Inventor: Ole Falk Smed, Calgary (CA)

(*) Notice: Subject to any disclaimer, the term of this patent is extended or adjusted under 35 U.S.C. 154(b) by 222 days.

(21) Appl. No.: 12/909,613

(22) Filed: Oct. 21, 2010

(65) Prior Publication Data

US 2012/0098437 A1   Apr. 26, 2012

(51) Int. Cl.

| F21S 6/00 | (2006.01) |
|---|---|
| F21V 29/70 | (2015.01) |
| H05B 45/14 | (2020.01) |
| H05B 45/30 | (2020.01) |
| F21V 21/28 | (2006.01) |
| F21Y 105/00 | (2016.01) |
| F21Y 103/00 | (2016.01) |
| F21V 29/507 | (2015.01) |
| F21Y 115/15 | (2016.01) |
| F21Y 115/10 | (2016.01) |
| H05B 47/11 | (2020.01) |
| F21V 23/04 | (2006.01) |
| F21V 29/76 | (2015.01) |

(52) U.S. Cl.
CPC .......... F21S 6/003 (2013.01); F21V 23/0464 (2013.01); F21V 23/0471 (2013.01); F21V 29/70 (2015.01); H05B 45/14 (2020.01); H05B 45/30 (2020.01); H05B 47/11 (2020.01); F21V 21/28 (2013.01); F21V 29/507 (2015.01); F21V 29/763 (2015.01); F21Y 2103/00 (2013.01); F21Y 2105/00 (2013.01); F21Y 2115/10 (2016.08); F21Y 2115/15 (2016.08)

(58) Field of Classification Search
CPC .. F21S 6/002; F21S 6/003; F21S 6/004; F21S 6/005; F21S 6/006
USPC .......................................... 315/149, 291, 308
See application file for complete search history.

(56) References Cited

U.S. PATENT DOCUMENTS

| 6,220,722 | B1 | 4/2001 | Begemann | |
|---|---|---|---|---|
| 6,279,753 | B1 * | 8/2001 | Swanson | 211/13.1 |
| D471,665 | S * | 3/2003 | Huang | D26/145 |
| 6,857,756 | B2 | 2/2005 | Reiff et al. | |
| 6,979,100 | B2 | 12/2005 | Reiff et al. | |
| 7,334,918 | B2 | 2/2008 | Newton et al. | |
| 7,625,099 | B2 | 12/2009 | Newton et al. | |

(Continued)

OTHER PUBLICATIONS

Occupational Safety and Health Branch of Labour Department ("A simple Guide to Health Risk Assessment", Feb. 2003).*

(Continued)

*Primary Examiner* — Alexander H Taningco
(74) *Attorney, Agent, or Firm* — Carl A. Hjort, III

(57) ABSTRACT

A task light that includes a plurality of light emitting diodes (LED's) adapted for providing a variable intensity of emitted light; a light directing member for directing light from the LED's onto a work surface; a control logic, electrically connected to a light intensity selector, an ambient light sensor, and the plurality of LED's and wherein the control logic compares the intensity of ambient light in the area surrounding the work surface with the desired intensity of light to be provided at the work surface and adjusts the supply of electrical power to the LED's so that the total of the variable intensity of emitted light and the intensity of ambient light in the area surrounding the work surface is approximately equal to the desired intensity of light to be provided at the work surface.

9 Claims, 13 Drawing Sheets

(56) References Cited

U.S. PATENT DOCUMENTS

| | | | |
|---|---|---|---|
| 7,641,361 B2 | 1/2010 | Wedell et al. | |
| 7,738,235 B2 | 6/2010 | Glostein et al. | |
| 7,745,957 B2 | 6/2010 | Bayat et al. | |
| 8,016,457 B2* | 9/2011 | Clark et al. | 362/294 |
| 2004/0105264 A1 | 6/2004 | Spero | |
| 2005/0190142 A1* | 9/2005 | Ferguson | 345/102 |
| 2008/0149810 A1* | 6/2008 | Tracy et al. | 250/204 |
| 2008/0205080 A1* | 8/2008 | Erchak | G02B 6/0085 362/613 |
| 2010/0315833 A1* | 12/2010 | Holman | G02B 6/0028 362/607 |

OTHER PUBLICATIONS

University of Campinas ("Lighting in the Workplace", Feb. 2002).*
Queen's University Belfast ("Lighting at Work", Jan. 2010).*

* cited by examiner

AUTOMATICALLY ADJUSTING TASK LIGHT

DETAILED DESCRIPTION OF THE DRAWINGS

Embodiments of an automatically adjusting task light are shown and described. Generally, the task light comprises a light source; a housing adapted to receive the light source; a light directing member retained in the housing and capable of directing light emitted from the light source onto a work surface; a light intensity selector; an ambient light sensor; and a control circuit that compares the intensity of ambient light in the area surrounding the work surface with a user-inputted desired intensity of light at the work surface, and then adjusts the supply of electrical power to the light source, so that the total of the light supplied by the lamp and the ambient light is approximately equal to the desired intensity of light at the work surface. In this way, the task light efficiently provides light to the work surface by providing no more light than is required, in view of the ambient lighting conditions, to satisfy the user's light intensity requirements for the work surface. The task light may be mounted on an adjustable arm with a mounting member, or it may be adapted for under-cabinet mounting. The task light may also comprise an occupancy sensor which determines if a person is in the work area, and deactivates the light when a person is not present in the work area.

Figure 1:
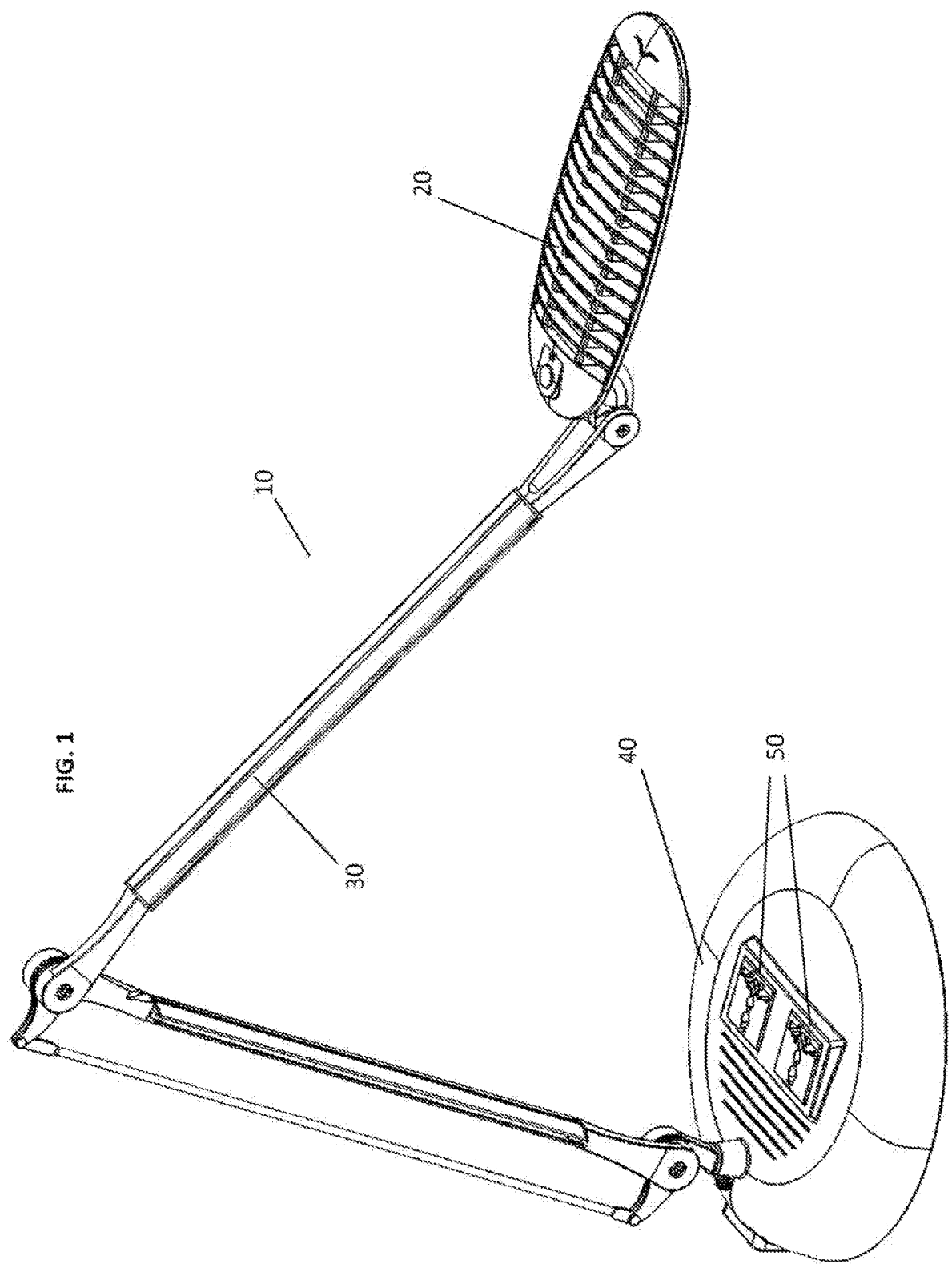
FIG. 1 is a perspective view of the complete assembly of a first embodiment of a task light.
Figure 2:
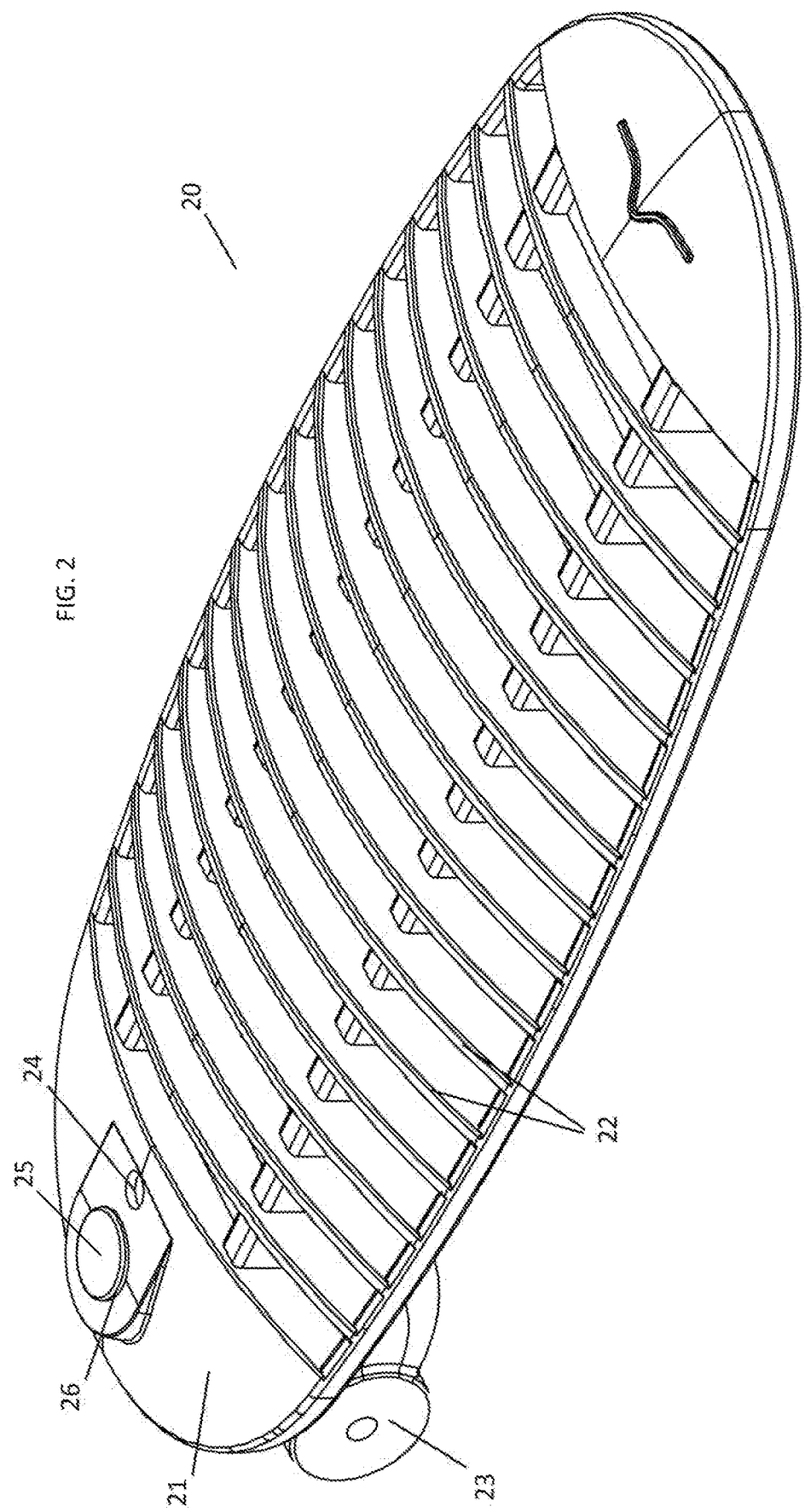
FIG. 2 is a perspective view of the lamp assembly for a first embodiment of a task light.
Figure 3:
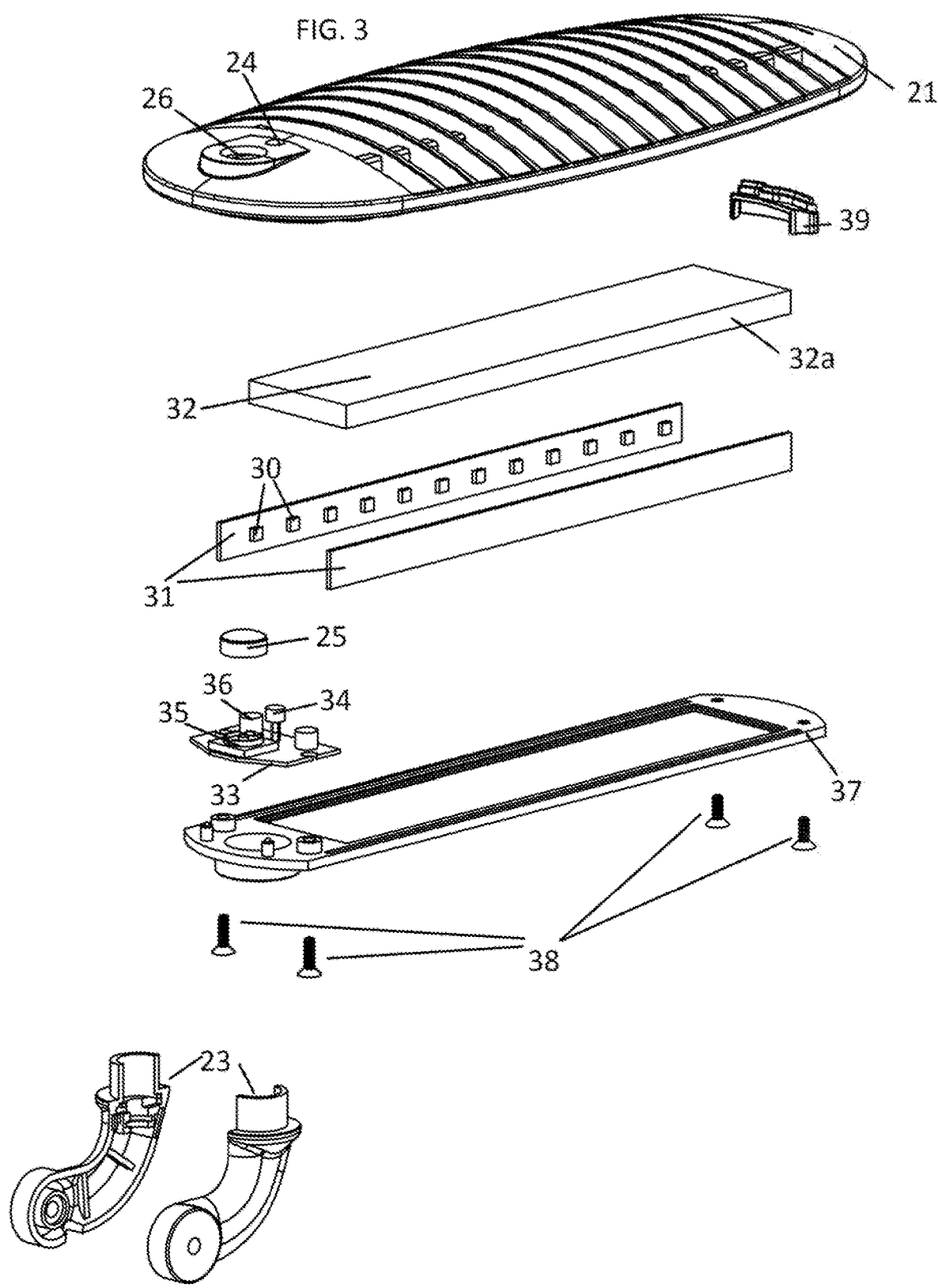
FIG. 3 is an exploded view of the lamp assembly for a first embodiment of a task light.

Referring now to FIGS. 1 through 3, a first embodiment of the task light is shown in these figures. As shown in FIG. 1, the task lamp 10 is comprised of a lamp head 20, mounted on an adjustable arm 30. Adjustable arm 30 is also connected to base member 40. Base member 40 may optionally include electrical outlets 50, for supplying electrical power to appliances in the work area other than the task lamp. Electrical power is supplied to base member 40 via a cord (not shown) which interfaces with a standard wall outlet. Electrical power from the wall outlet may be transformed into an acceptable voltage for use in the lamp by means of a transformer power supply (not shown) which may be located interior or exterior to the base member 40. Electrical power suitable for the operation of the lamp is supplied from the base member 40 to the lamp head 20 by means of a wire (also not shown) that is positioned adjacent to or within adjustable arm 30.

FIG. 2 shows a perspective view of lamp head 20. Lamp head 20 is comprised of housing 21. Housing 21 may be constructed of any suitable material, including, but not limited to aluminum, steel, other metals, carbon fiber or plastic. Housing 21 may be constructed of a thermally conductive material, in order to facilitate the dissipation of heat produced by the light source in the task lamp. In such an arrangement, the housing may be cast from aluminum. One of ordinary skill in the art will appreciate that different manufacturing techniques may be used, depending on the choice of materials for the housing and the manufacturability of the design, such techniques including but not limited to casting, stamping, or molding. As shown in FIG. 2, housing 21 is further comprised of fins 22 and arm engagement member 23. Fins 22 function to facilitate the dissipation of heat produced by the light source in the lamp. Arm engagement member 23 allows for the connection of the lamp head to the adjustable arm. Also provided in housing 21 is aperture 24. Aperture 24 allows ambient light to impinge upon an ambient light sensor located within housing 21. Finally, light intensity selector button 25 protrudes through an opening 26 in housing 21. As will be discussed in greater detail below, light intensity selector button 25 allows a user to input a desired intensity of light to be provided at the work surface adjacent to the task lamp.

FIG. 3 shows an exploded view of the lamp head. Disposed within housing 21 are substrates 31, upon which are carried light emitting diodes (LED's) 30. Although not visible in FIG. 3, LED's are disposed on both substrates 31 shown in FIG. 3. Substrates 31 may be made of a thermally conductive material, so as to conduct heat generated by the LED's away from the LED's and to transfer said heat to housing 21 for dissipation. By way of example, and without limitation, LED's 30 may be white light LED's, such as the White 3528 SMD LED supplied by Itswell Co., Ltd. One of ordinary skill in the art will readily appreciate that any suitable LED that provides the necessary light intensity and color could be used for LED's 30. Moreover, LED's 30 may be selected as colored LED's instead of white light LED's and may provide colored light. Alternatively, LED's 30 may be selected to provide at least two complimentary colors, and be arranged such that their beam patterns overlap, thereby producing metameric white light.

Also shown in FIG. 3 is light directing member 32. Light directing member 32 may be a light guide board. If light directing member 32 is a light-guide board, LED's 30 are placed in contact with major edge 32a (and the corresponding opposite edge) of the light directing member 32. Light emitted from LED's 30 is then redirected by light directing member 32 onto a work surface. One of ordinary skill in the art will readily appreciate that numerous different optical elements could be used as light directing member 32 to direct light from the LED's onto a work surface. For example, in addition to being a light guide board, light directing member 32 may be a lens, a reflector, a collimator, a window, a diffuser, or combinations thereof. Additionally, LED's 30 need not be aligned along major edge 32*a* (and the corresponding opposite edge) of light directing member 32, and LED's 30 may be arranged in any orientation that is compatible with the optical element selected to function as light directing member 32.

Circuit board 33 is also shown in FIG. 3. Circuit board 33 has disposed on it ambient light sensor 34. Ambient light sensor 34 functions to measure the amount of ambient light in the area surrounding the task light. Ambient light sensor 34 is aligned with aperture 24 in housing 21, so that ambient light in the area surrounding the task light can impinge upon ambient light sensor 34. By way of example, and without limitation, ambient light sensor may be an AS 3026-D02 ambient light sensor produced by Integrated Crystal Technology Incorporation. One of ordinary skill in the art would appreciate that any acceptable photoreceptor sensor capable of measuring ambient light intensity in the area surrounding the task light could be used as ambient light sensor 34. Also disposed on circuit board 33 is rotary switch 35. Rotary switch 35 is controlled by light intensity selector button 25, which protrudes through housing 21. Together, rotary switch 35 and light intensity selector button 25 comprise a light intensity selector. By way of example, and without limitation, rotary switch 35 may be a 3S series rotary switch produced by the Huai Yang Co., Ltd. Rotary switch 35 functions to allow a user to select a desired light intensity at the work surface by manipulating the position of the switch. One of ordinary skill in the art will readily appreciate that other models of rotary switches could be used or that other types of switches, which allow a user to select one of a number of possible states for the switch, could be used in place of rotary switch 35.

Also present on circuit board 33 is control logic 36. Control logic 36 is electrically connected to ambient light sensor 34 and rotary switch 35. Control logic 36 is also electrically connected to LED's 30 and it is also connected to the wire (not shown) that provides an appropriate supply of electrical power to the lamp head 20. In operation, a user manipulates the rotary switch 35, by way of the light intensity selector button 25, to set a desired intensity of light at the work surface. Ambient light sensor 34 measures the intensity of ambient light in the area surrounding the task light. Both of the aforementioned values, i.e. the desired intensity of light at the work surface and the intensity of ambient light in the area surrounding the task light are provided to the control logic 36. The control logic 36 compares these values and adjusts the supply of electrical power to the LED's 30 so that the total of the light emitted by the LED's 30 and the intensity of ambient light in the area surrounding the work surface is approximately equal to the desired intensity of light to be provided at the work surface. In this way, the task light efficiently provides the amount of light required by the user in view of the ambient light conditions. In cases where the intensity of ambient light in the area surrounding the work surface exceeds the desired intensity of light at the work surface, the control logic 36 will provide a nominal amount of power to the LED's 30. The nominal amount of power provided by the control logic 36 to the LED's 30 in such a case may be less than 10% of the maximum operating power of the LED's 30. If the intensity of the ambient light in the area surrounding the task light changes, the control logic 36 will change the amount of power supplied to the LED's 30, so as to maintain the relationship between the aforementioned variables, i.e. that the total of the light emitted by the LED's 30 and the intensity of ambient light in the area surrounding the work surface is approximately equal to the desired intensity of light to be provided at the work surface. In this way, the lamp continuously provides the amount of light required by the user in view of the ambient light conditions. While each of the ambient light sensor 34, the rotary switch 35 and the control logic 36 are all shown as resident on circuit board 33, it would be readily apparent to one of ordinary skill in the art that these components could be separated from each other, onto multiple substrates, and placed in any number of locations on the task lamp depending on design choices for the lamp. As long as these components are electrically connected to each other, their location and physical relationship to each other is not relevant.

As shown in FIG. 3, the substrates 31, the light directing member 32, and the circuit board 33 are retained in housing 21 by retaining member 37. Retaining member 37 is secured to housing 21 by fasteners 38. One of ordinary skill in the art will readily appreciate that any form of fastener or method of fastening commonly used in the art would be acceptable to secure retaining member 37 to housing 21. Retaining member 37 also receives arm engagement member 23, and connects arm engagement member 23 to housing 21. Optionally, logo member 39 can be provided in housing 21. Logo member 39 may be a transparent logo and be placed in close proximity to light directing member 32. In such a way, a small amount of light will escape from light directing member 32 and pass through logo member 39, thereby indicating to a user that the task light is in operation.

Figure 4:
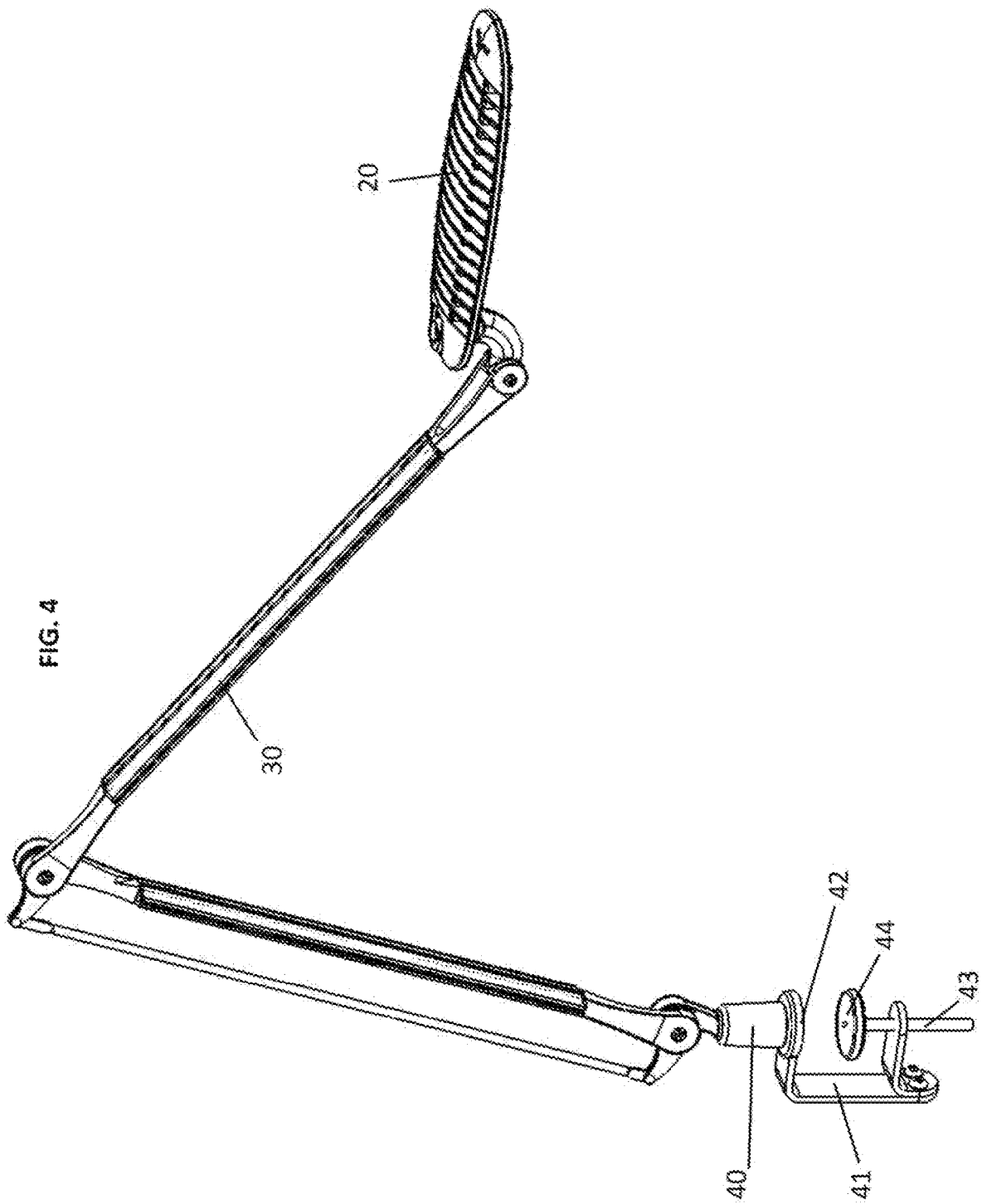
FIG. 4 is a perspective view of a first embodiment of a task light showing a first embodiment of a mounting member.

Referring now to FIGS. 4 through 7, these figures show various embodiments for a mounting member for the task light. FIG. 4 shows the general configuration of the task light, with a lamp head 20, adjustable arm 30 and mounting member 40. In FIG. 4, mounting member 40 is a C-clamp type mounting member. In this arrangement, clamp member 41 is connected to adjustable arm 30. Clamp member 41 has a clamping surface 42 and adjustable member 43 with a second clamping surface 44. Adjustable member may be adjustable by way of threads to bias second clamping surface 44 in the direction of clamping surface 42. In use, a desktop or table is disposed between clamping surface 42 and second clamping surface 44, and adjustable member 43 is adjusted to clamp the clamping member 41 to the desk or table, thereby rigidly mounting the task light to the desk or table.

Figure 5:
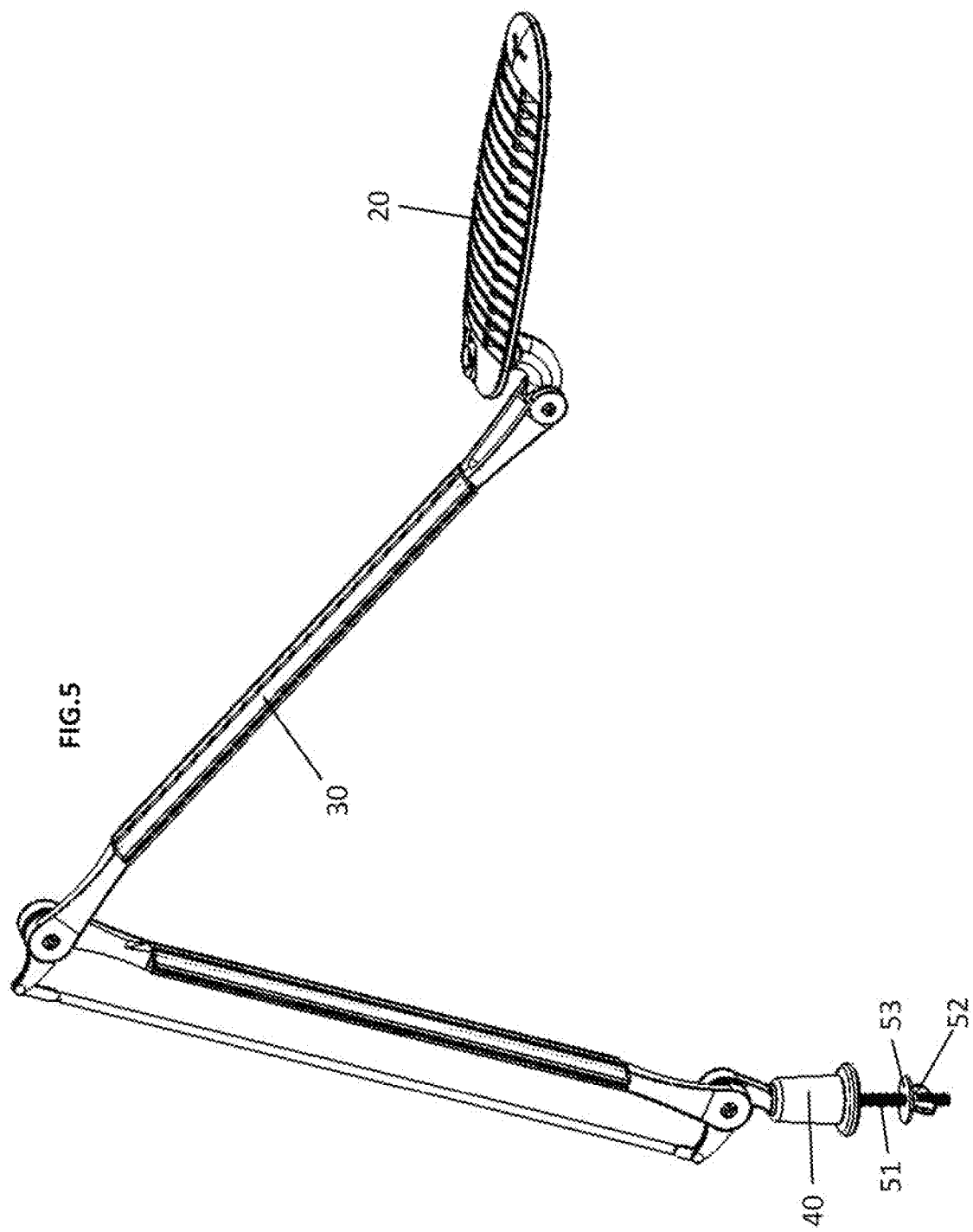
FIG. 5 is a perspective view of a first embodiment of a task light showing a second embodiment of a mounting member.

FIG. 5 shows an alternate embodiment for a mounting member for the task light. FIG. 5 shows the general configuration of the task light, with a lamp head 20, adjustable arm 30 and mounting member 40. In FIG. 5, the mounting member is a through-bolt type mounting member. In this arrangement, bolt 51 extends from the bottom of mounting member 40. Nut 52 and optionally washer 53 are provided on bolt 51. In this arrangement, a through hole must be drilled in the surface, e.g. a desk surface, to which the lamp will be mounted. Bolt 51 is then passed through the through hole and secured with nut 52 to mount the task light in place.

Figure 6:
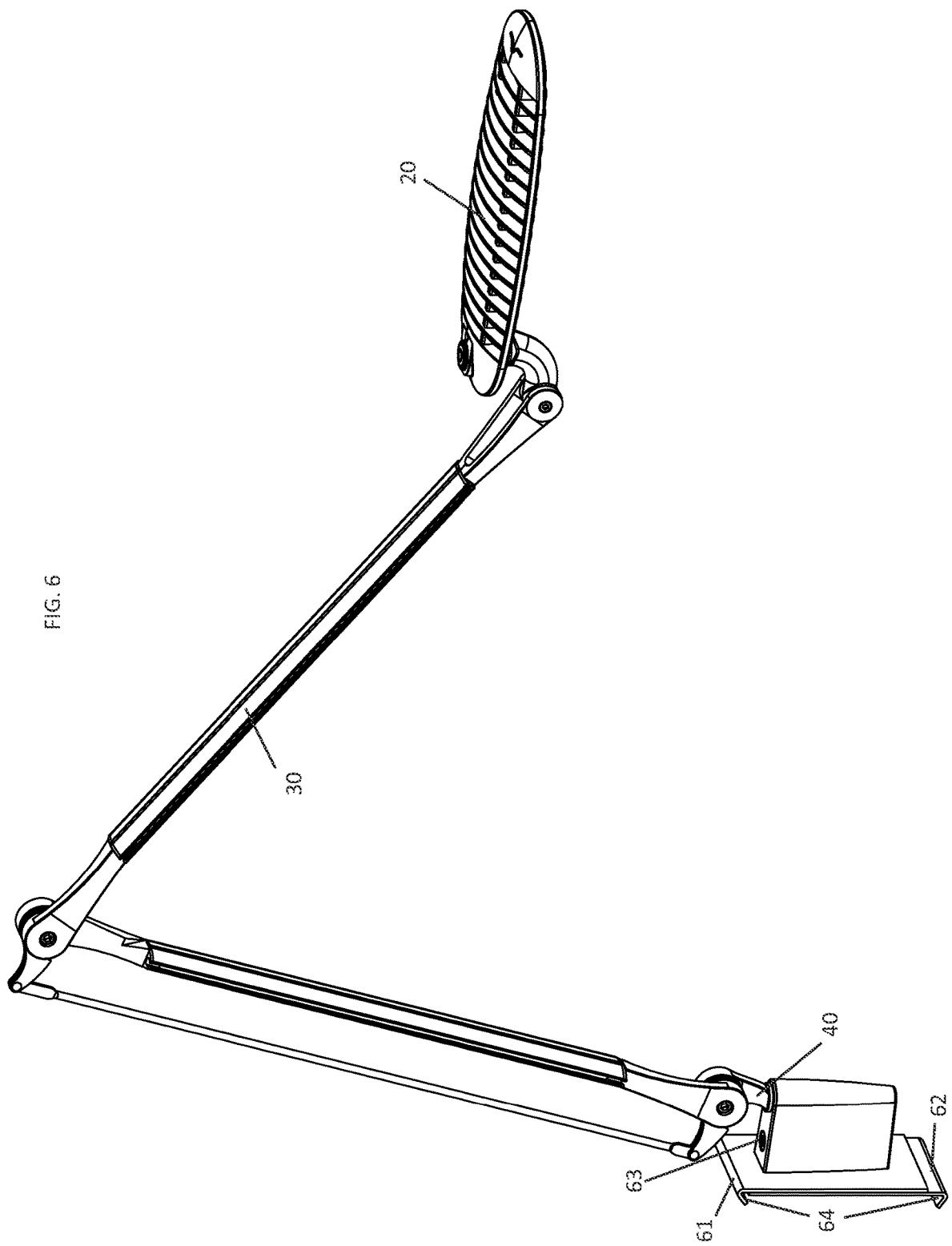
FIG. 6 is a perspective view of a first embodiment of a task light showing a third embodiment of a mounting member.

FIG. 6 shows another alternate embodiment for a mounting member for the task light. FIG. 6 shows the general configuration of the task light, with a lamp head 20, adjustable arm 30 and mounting member 40. In FIG. 6, the mounting member is an adjustable slat-wall bracket. In this arrangement, a fixed bracket portion 61 and an adjustable bracket portion 62 are provided. Adjustable bracket portion 62 is connected inside the hollow body of mounting member 40 to screw 63. By turning screw 63, adjustable bracket portion 62 can be raised or lowered relative to fixed bracket portion 61. The curved ends 64 of bracket portions 61 and 62 engage with slats provided in a mounting surface, and with the tightening of screw 63, the task light can be secured to the slatted surface.

Figure 7:
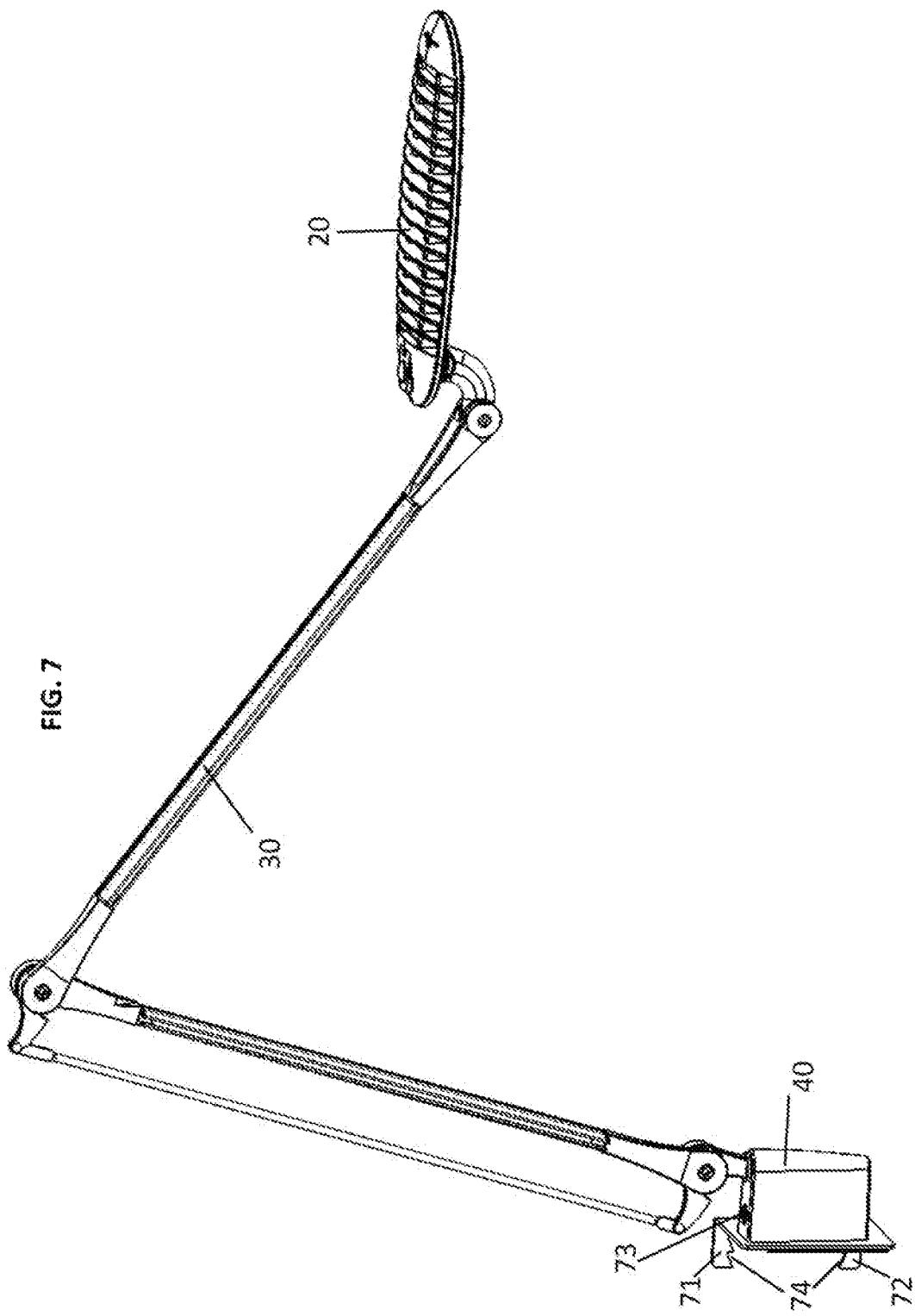
FIG. 7 is a perspective view of a first embodiment of a task light showing a fourth embodiment of a mounting member.

FIG. 7 shows another alternate embodiment for a mounting member for the task light. In this arrangement the general configuration of the task light, with a lamp head 20, adjustable arm 30 and mounting member 40 is again shown. In FIG. 7, the mounting member is an adjustable panel-mount bracket. In this arrangement, a fixed bracket portion 71 and an adjustable bracket portion 72 are provided. Adjustable bracket portion 72 is connected inside the hollow body of mounting member 40 to screw 73. By turning screw 73, adjustable bracket portion 72 can be raised or lowered relative to fixed bracket portion 71. The serrated ends 74 of bracket portions 71 and 72 engage with grooves provided in a panel mounting surface, and with the tightening of screw 73, the task light can be secured to the panel. The serrated ends 74 of bracket portions 71 and 72 are designed to engage with grooves of different depths in the panels. With reference to FIGS. 4 through 7, one of ordinary skill will appreciate that the light may also be provided without a mounting member in such cases where the customer already has a mounting member, or is providing a custom mounting member.

Figure 8:
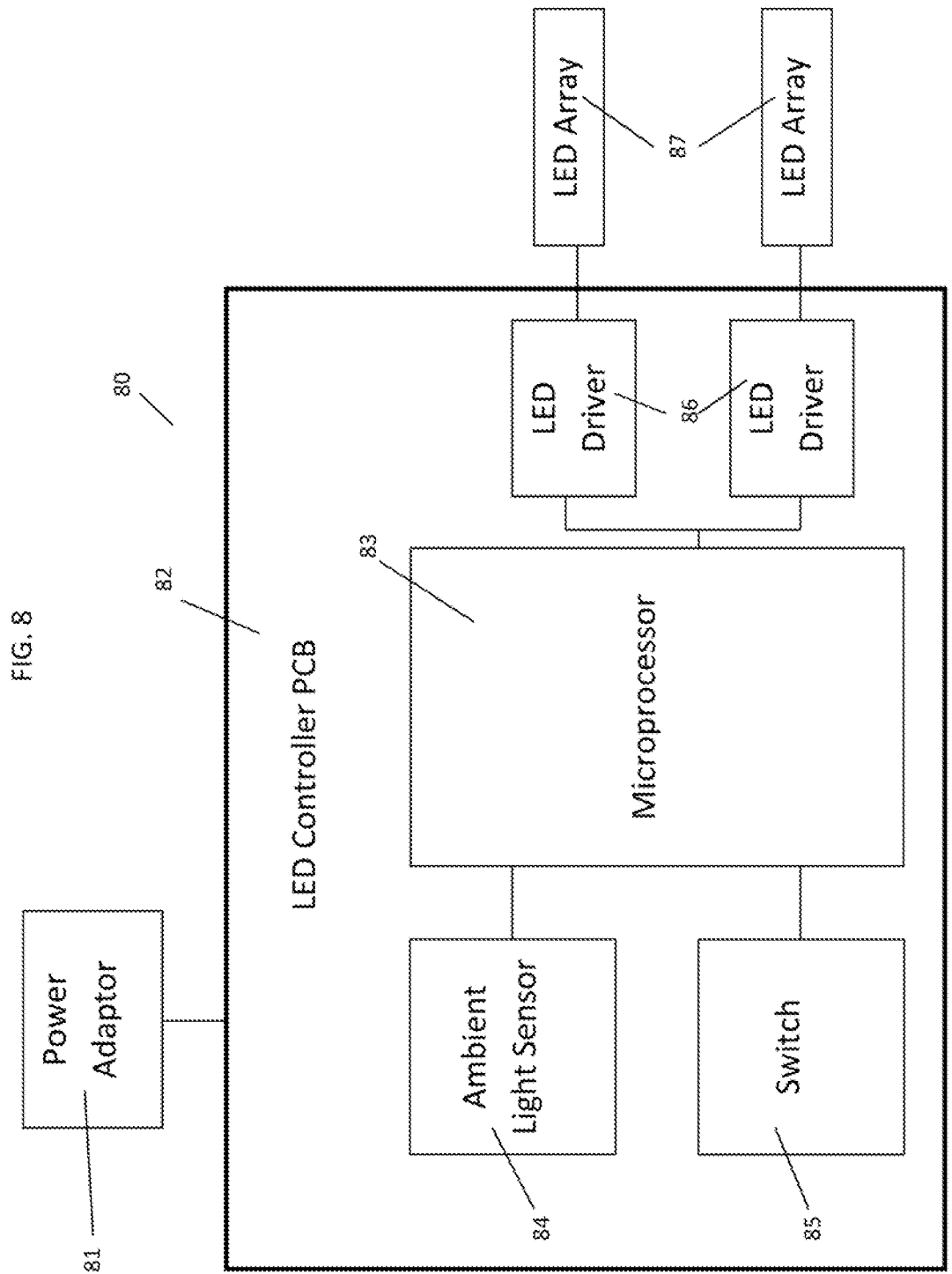
FIG. 8 is a block diagram for the control circuit used in embodiments of the task light.

FIG. 8 shows a block diagram for the control circuit 80 used in embodiments of the task light. Electrical power is supplied by power adaptor 81 to the LED Controller PCB 82. Power adaptor 81 may transform electricity supplied from a standard household outlet into a more suitable voltage for use in the lamp. Power adaptor 81 may also condition the voltage in any way required for operation of the lamp, and may rectify alternating current into direct current if necessary for the operation of the lamp. One of ordinary skill will appreciate that power adaptor 81 may function to transform, condition, rectify or modify the electrical power input in any other way to make it suitable for use in the task lamp.

Microprocessor 83 is resident on LED Controller PCB 82. By way of example and without limitation, microprocessor 83 may be a SN8P2711A/SOP14 type processor manufactured by Sonix Technology CO., Ltd. As shown in FIG. 8, microprocessor 83 is electrically connected to ambient light sensor 84 and switch 85. As discussed supra, ambient light sensor may be an AS 3026-D02 ambient light sensor produced by Integrated Crystal Technology Incorporation, although one of ordinary skill in the art would appreciate that any acceptable photoreceptor sensor capable of measuring ambient light intensity in the area surrounding the task light or the intensity of light impinging on the work surface could be used as ambient light sensor 84. Switch 85 may be a 3S series rotary switch produced by the Huai Yang Co., Ltd., although one of ordinary skill in the art would readily appreciate that any switch capable of allowing a user to select one of a plurality of desired light intensities at the work surface could be used as switch 85.

In operation, a user manipulates the switch 85, to set a desired intensity of light at the work surface. Ambient light sensor 84 measures the intensity of ambient light in the area surrounding the task light (or the intensity of light impinging on the work surface in an alternate embodiment). Both of the aforementioned values, i.e. the desired intensity of light at the work surface and the intensity of ambient light in the area surrounding the task light are provided to the microprocessor 83. Microprocessor 83 compares these values and adjusts the supply of electrical power received from power adaptor 81 and sent to LED drivers 86. By way of example and without limitation, LED drivers 86 may be G2610T11U/ SOT-23-5 drivers manufactured by Global Mixed Mode Technologies, Inc. LED arrays 87 are of the type discussed supra in the description of FIG. 3. However, one of ordinary skill in the art will readily appreciate that light sources other than LED's could be used in the alternate embodiments described herein, and in the case where alternate light sources are used, LED drivers 86 may not be necessary or may be replaced by other components for driving the alternate light sources.

More specifically, microprocessor 83 controls the supply of electrical power to LED drivers 86 so that the total of the light emitted by the LED arrays 87 and the intensity of ambient light in the area surrounding the work surface (or the intensity of light impinging on the work surface in an alternate embodiment) is approximately equal to the desired intensity of light to be provided at the work surface, as input by the user. In this way, the task light efficiently provides the amount of light required by the user in view of the ambient light conditions. In cases where the intensity of ambient light in the area surrounding the work surface (or impinging on the work surface in an alternate embodiment) exceeds the desired intensity of light at the work surface, the microprocessor 83 will provide a nominal amount of power to LED drivers 86. The nominal amount of power provided by the microprocessor 83 to the LED drivers 86 in such a case may be less than 10% of the maximum operating power of the LED arrays 87. If the intensity of the ambient light in the area surrounding the task light (or the intensity of light impinging on the work surface in an alternate embodiment) changes, the microprocessor will change the amount of power supplied to the LED drivers 86, so as to maintain the relationship between the aforementioned variables, i.e. that the total of the light emitted by the LED arrays 87 and the intensity of ambient light in the area surrounding the work surface (or the intensity of the light impinging on the work surface in an alternate embodiment) is approximately equal to the desired intensity of light to be provided at the work surface. In this way, the lamp continuously provides the amount of light required by the user in view of the ambient light conditions. While each of the ambient light sensor 84, the switch 85 and the microprocessor 83 are all shown as resident on LED controller PCB 82, it would be readily apparent to one of ordinary skill in the art that these components could be separated from each other, onto multiple substrates, and placed in any number of locations on or in the task lamp depending on design choices for the lamp. As long as these components are electrically connected to each other, their location and physical relationship to each other is not relevant.

Figure 9:
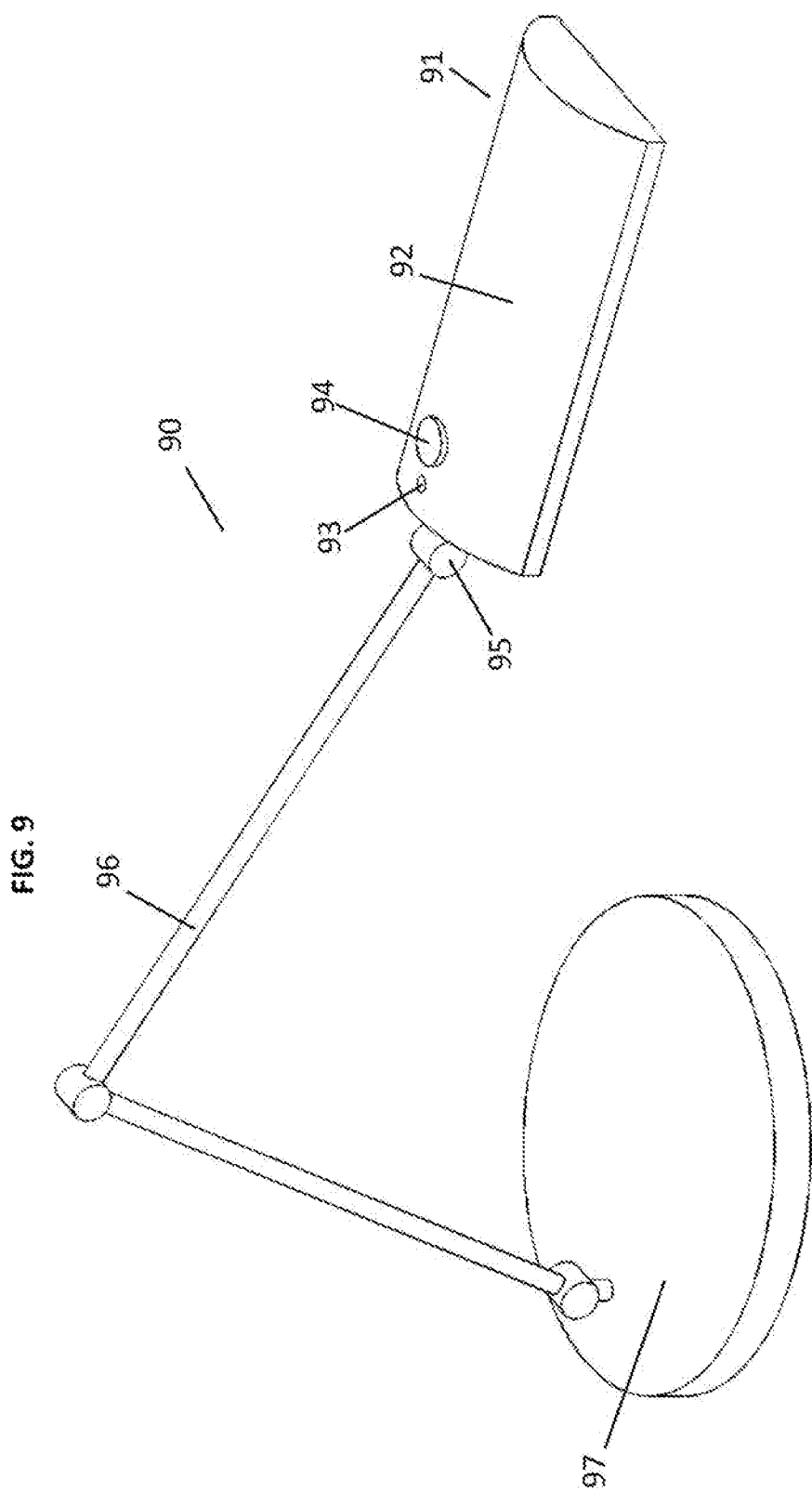
FIG. 9 is a perspective view of a second embodiment of a task light.

FIG. 9 shows a second alternate embodiment for a task light. As with the previous embodiment, the task light 90 is generally comprised of a lamp head 91, an adjustable arm 96 and a base member 97. Lamp head 91 is comprised of housing 92, along with electrical and optical elements disposed therein. Also shown in FIG. 9 is aperture 93, which allows ambient light in the area surrounding the task light to impinge on ambient light sensor located in the interior of housing 92. Additionally, light intensity selector button 94 is provided to allow a user to input a desired light intensity at the work surface. Housing 92 for the alternate embodiment shown in FIG. 9 may be constructed of any suitable material, including, but not limited to aluminum, steel, other metals, carbon fiber or plastic. Housing 92 may be constructed of a thermally conductive material, in order to facilitate the dissipation of heat produced by the light source in the task lamp. In such an arrangement, the housing may be cast from aluminum. Housing 92, however, need not be constructed of thermally conductive material to facilitate heat dissipation, and need not be provided with fins for heat dissipation. Other approaches for dissipating the heat produced by the light source in the lamp head 91 may be used, such as use of a fan to cool said light source. One of ordinary skill in the art will appreciate that different manufacturing techniques may be used, depending on the choice of materials for the housing and the manufacturability of the design, such techniques including but not limited to casting, stamping, or molding. Arm engagement member 95 allows for the connection of the lamp head to the adjustable arm.

The second embodiment of the task light shown in FIG. 9 functions in the same way as the first embodiment depicted in FIGS. 1 through 3. A circuit board (not shown) is provided in the interior of housing 92. The circuit board has disposed on it ambient light sensor (not shown). Ambient light sensor functions to measure the amount of ambient light in the area surrounding the task light. Ambient light sensor is aligned with aperture 93 in housing 92, so that ambient light in the area surrounding the task light can impinge upon ambient light sensor. One of ordinary skill in the art would appreciate that any acceptable photoreceptor sensor capable of measuring ambient light intensity in the area surrounding the task light could be used as ambient light sensor. Also disposed on circuit board is rotary switch (not shown). Rotary switch is controlled by light intensity selector button 94, which protrudes through housing 92. Together, rotary switch and light intensity selector button 94 comprise a light intensity selector. The rotary switch functions to allow a user to select a desired light intensity at the work surface by manipulating the position of the switch.

Also present on the circuit board is a control logic (not shown). The control logic is electrically connected to the ambient light sensor and the rotary switch. Control logic is also electrically connected to light sources (not shown) and it is also connected to the wire (not shown) that provides an appropriate supply of electrical power to the lamp head 91. In operation, a user manipulates the rotary switch, by way of the light intensity selector button 94, to set a desired intensity of light at the work surface. Ambient light sensor measures the intensity of ambient light in the area surrounding the task light. Both of the aforementioned values, i.e. the desired intensity of light at the work surface and the intensity of ambient light in the area surrounding the task light are provided to the control logic. The control logic compares these values and adjusts the supply of electrical power to the light sources so that the total of the light emitted by the light sources and the intensity of ambient light in the area surrounding the work surface is approximately equal to the desired intensity of light to be provided at the work surface. In this way, the task light efficiently provides the amount of light required by the user in view of the ambient light conditions. In cases where the intensity of ambient light in the area surrounding the work surface exceeds the desired intensity of light at the work surface, the control logic will provide a nominal amount of power to the light sources. The nominal amount of power provided by the control logic to the light sources in such a case may be less than 10% of the maximum operating power of the light sources. If the intensity of the ambient light in the area surrounding the task light changes, the control logic will change the amount of power supplied to the light sources, so as to maintain the relationship between the aforementioned variables, i.e. that the total of the light emitted by the light sources and the intensity of ambient light in the area surrounding the work surface is approximately equal to the desired intensity of light to be provided at the work surface. In this way, the lamp continuously provides the amount of light required by the user in view of the ambient light conditions.

Figure 10:
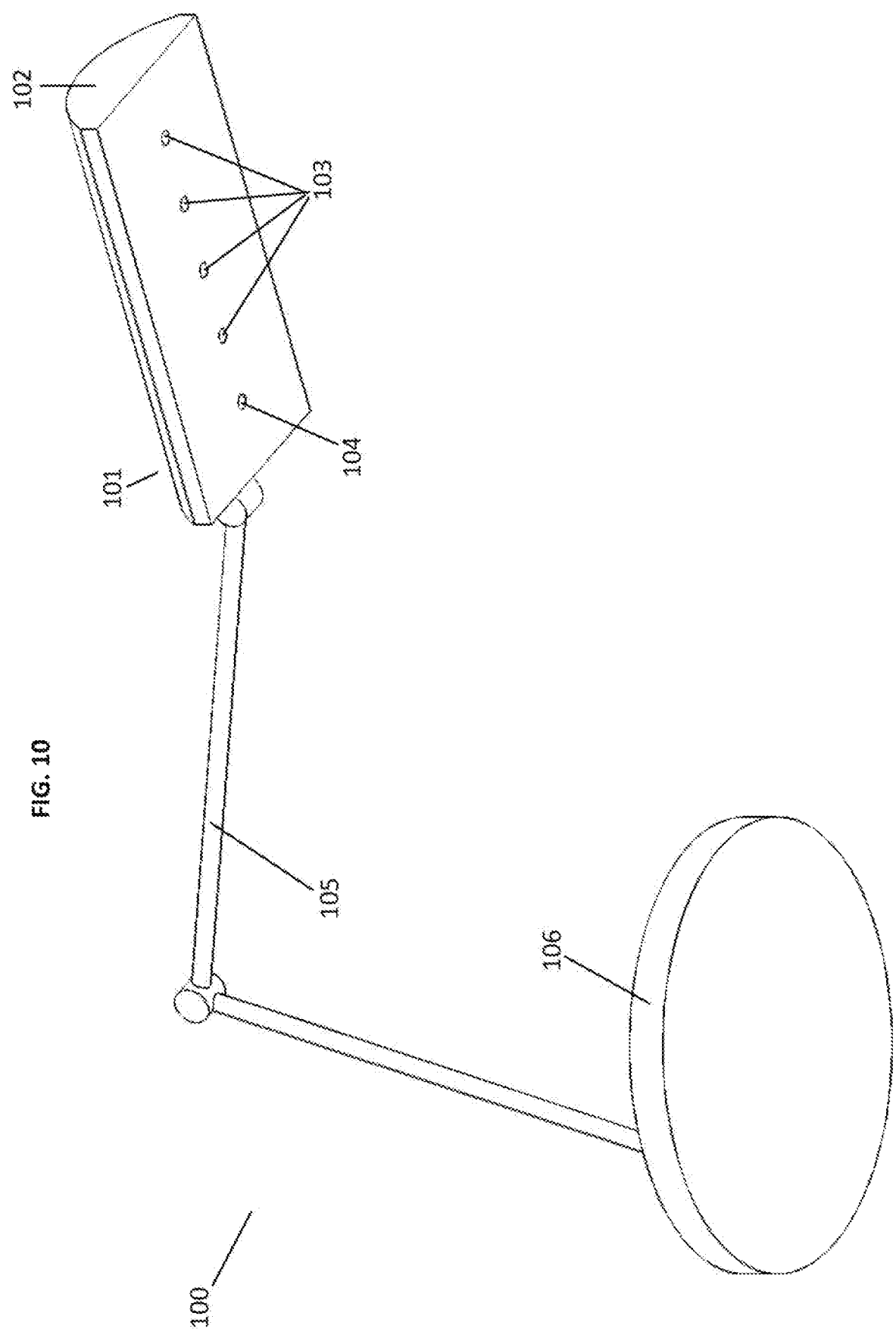
FIG. 10 is a perspective view of a third embodiment of a task light, showing an alternate location for the light sensor.

FIG. 10 illustrates a third alternate embodiment of the task light. This third alternate embodiment 100 generally comprises lamp head 101, adjustable arm 105, and base member 106. Lamp head 101 is comprised of housing 102. Housing 102 may be constructed in the same manner as described in connection with the second embodiment of the task lamp shown in FIG. 9. Light sources 103 are shown in FIG. 10. Light sources 103 may be LED's. Alternatively, light sources 103 may be an incandescent bulb, a fluorescent bulb or an organic LED. One of ordinary skill in the art will readily appreciate that any suitable light source can be used in the task light, as long as the light source provides adequate luminous intensity. These alternative light sources disclosed in relation to this embodiment may also be used in connection with the second embodiment disclosed in FIG. 9. Both of the second and third embodiments of the task lamps, depicted in FIGS. 9 and 10, use a light directing member (not shown). One of ordinary skill in the art will readily appreciate that numerous different optical elements could be used as light directing member in these embodiments to direct light from the light sources onto a work surface. For example, the light directing member may be a light guide board, a lens, a reflector, a collimator, a window, a diffuser, or combinations thereof. Additionally, the light sources in these embodiments may be arranged in any orientation that is compatible with the optical element selected to function as light directing member.

The third embodiment of the task lamp shown in FIG. 10 operates in a different manner from the first and second alternate embodiments disclosed. Instead of providing an aperture in the top of the housing for the ambient light sensor, in the third embodiment, an aperture 104 is provided in the bottom of the housing for a work surface light sensor, adapted to determine an intensity of light impinging upon the work surface. Also provided in the third embodiment is a light intensity selector button (not shown) and an rotary switch (not shown) that allow a user to input a desired intensity of light provided at the work surface. These components may be provided on a circuit board disposed within housing 102.

Also present on the circuit board is a control logic (not shown). The control logic is electrically connected to the work surface light sensor and the rotary switch. Control logic is also electrically connected to light sources (not shown) and it is also connected to the wire (not shown) that provides an appropriate supply of electrical power to the lamp head 101. In operation, a user manipulates the rotary switch, by way of the light intensity selector button, to set a desired intensity of light at the work surface. Work surface light sensor measures the intensity of light impinging upon the work surface. Both of the aforementioned values, i.e. the desired intensity of light at the work surface and the intensity of light impinging upon the work surface are provided to the control logic. The control logic compares these values and adjusts the supply of electrical power to the light sources so that the total of the light emitted by the light sources and the intensity of light impinging upon the work surface is approximately equal to the desired intensity of light to be provided at the work surface. In this way, the task light efficiently provides the amount of light required by the user in view of the light conditions at the work surface. In cases where the intensity of light impinging upon the work surface exceeds the desired intensity of light at the work surface, the control logic will provide a nominal amount of power to the light sources. The nominal amount of power provided by the control logic to the light sources in such a case may be less than 10% of the maximum operating power of the light sources. If the intensity of light impinging upon the work surface changes, the control logic will change the amount of power supplied to the light sources, so as to maintain the relationship between the aforementioned variables, i.e. that the total of the light emitted by the light sources and the intensity of light impinging upon the work surface is approximately equal to the desired intensity of light to be provided at the work surface. In this way, the lamp continuously provides the amount of light required by the user in view of the light conditions at the work surface.

Figure 11:
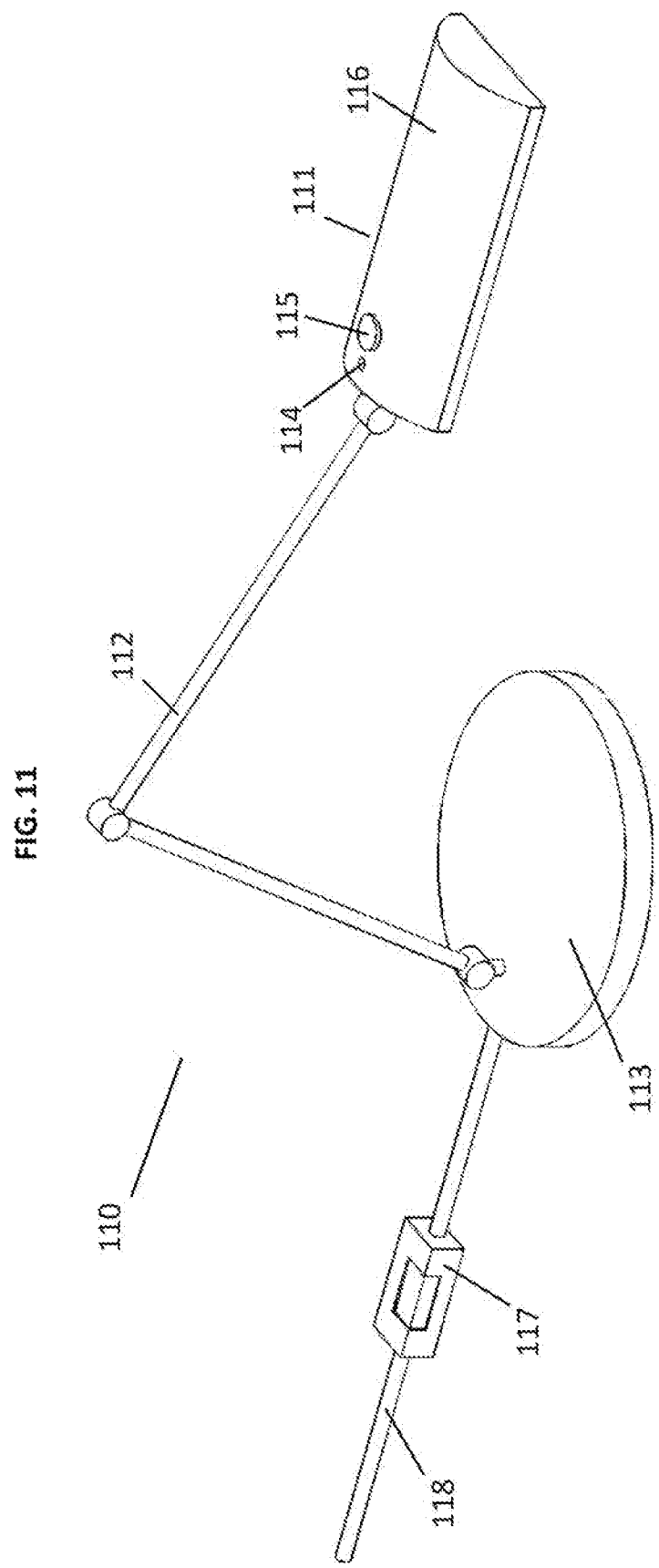
FIG. 11 is a perspective view of a fourth embodiment of a task light, showing an additional occupancy sensor added to the task light.

FIG. 11 depicts a fourth embodiment of the task light 110. As with the previous embodiments, task light 110 is generally comprised of lamp head 111, adjustable arm 112, and base member 113. As shown in FIG. 11, lamp head 111 has an aperture 114 and a light intensity selector button 115 disposed on the top of the housing 116. The lamp head 111 used in the fourth embodiment may be constructed in the same manner as disclosed in relation to any of the forgoing embodiments of the task lamp. Alternatively, a lamp head similar to the one employed in the third embodiment may be used in the fourth embodiment, i.e. a lamp head having an aperture on the bottom of the housing, and having a work surface light sensor adapted to determine an intensity of light impinging on the work surface. Also shown in FIG. 11 is occupancy sensor 117 which is in electrical connection with power supply cord 118. Occupancy sensor 117 is adapted to detect the presence of a person in the area adjacent to the task light and to turn the task light off when a person is not present in the area adjacent to the task light. One of ordinary skill in the art will readily appreciate that any occupancy sensor switch suitable for use in the area around a task lamp would be suitable for use as occupancy sensor 117. Occupancy sensor 117 may operate by detecting infrared radiation in the area surrounding the task light that is produced by the presence of a person. In operation, when occupancy sensor detects the presence of a person in the area surrounding the task light, it allows the flow of electrical power to task lamp 110. If the occupancy sensor does not detect the presence of a person in the area surrounding the task light, it interrupts the flow of electrical power to the task lamp. Occupancy sensor 117 is shown as a separate component in FIG. 11, however, one of ordinary skill in the art will readily appreciate that occupancy sensor 117 could be built into base 113, or it could be resident in housing 116, as long as it is arranged in such a way to allow for the detecting of a person in the area surrounding the task light.

Figure 12:
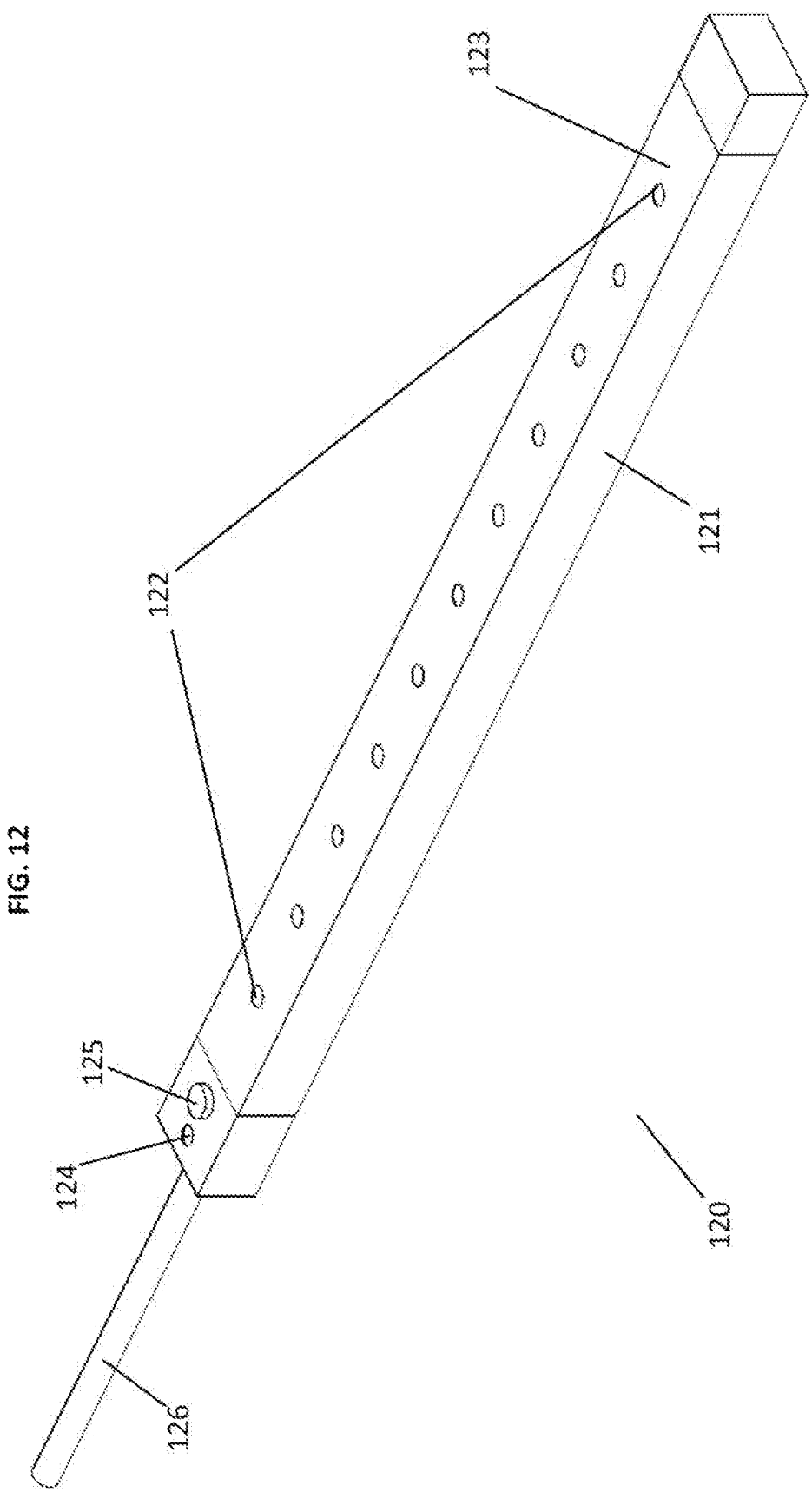
FIG. 12 is a perspective view of a fifth embodiment of a task light, adapted for under-cabinet mounting.

FIG. 12 depicts a fifth embodiment of a task light 120. Task light 120 has a housing 121. Housing 121 for the alternate embodiment shown in FIG. 12 may be constructed of any suitable material, including, but not limited to aluminum, steel, other metals, carbon fiber or plastic. Housing 121 may be constructed of a thermally conductive material, in order to facilitate the dissipation of heat produced by the light source in the task lamp. Housing 121, however, need not be constructed of thermally conductive material to facilitate heat dissipation, and need not be provided with fins for heat dissipation. Other approaches for dissipating the heat produced by the light source in the task light 120 may be used, such as use of a fan to cool said light source. One of ordinary skill in the art will appreciate that different manufacturing techniques may be used, depending on the choice of materials for the housing and the manufacturability of the design, such techniques including but not limited to casting, stamping, or molding. Housing 121 may be adapted for under-cabinet mounting.

Light sources 122 are shown in FIG. 12. Light sources 122 may be LED's. Alternatively, light sources 122 may be an incandescent bulb, a fluorescent bulb or an organic LED. One of ordinary skill in the art will readily appreciate that any suitable light source can be used in the task light, as long as the light source provides adequate luminous intensity. Light directing member 123 is attached to or formed integral with housing 121. One of ordinary skill in the art will readily appreciate that numerous different optical elements could be used as light directing member 123 in this embodiment, to direct light from the light sources 122 onto a work surface. For example, light directing member 123 may be a light guide board, a lens, a reflector, a collimator, a window, a diffuser, or combinations thereof. Additionally, the light sources 122 in this embodiment may be arranged in any orientation that is compatible with the optical element selected to function as light directing member 123.

Also shown in FIG. 12 are aperture 124 and light intensity selector button 125. Aperture 124 is provided in the housing 121 for a work surface light sensor, adapted to determine an intensity of light impinging upon the work surface. Light intensity selector button 125 and a rotary switch (not shown) allow a user to input a desired intensity of light provided at the work surface. These components may be provided on a circuit board disposed within housing 121. Also present on the circuit board is a control logic (not shown). The control logic is electrically connected to the work surface light sensor and the rotary switch. Control logic is also electrically connected to light sources 122 and it is also connected to the wire 126 that provides an appropriate supply of electrical power to the task light 120. In operation, a user manipulates the rotary switch, by way of the light intensity selector button 125, to set a desired intensity of light at the work surface. Work surface light sensor measures the intensity of light impinging upon the work surface. Both of the aforementioned values, i.e. the desired intensity of light at the work surface and the intensity of light impinging upon the work surface are provided to the control logic. The control logic compares these values and adjusts the supply of electrical power to the light sources 122 so that the total of the light emitted by the light sources and the intensity of light impinging upon the work surface is approximately equal to the desired intensity of light to be provided at the work surface. In this way, the task light efficiently provides the amount of light required by the user in view of the light conditions at the work surface. In cases where the intensity of light impinging upon the work surface exceeds the desired intensity of light at the work surface, the control logic will provide a nominal amount of power to the light sources 122. The nominal amount of power provided by the control logic to the light sources 122 in such a case may be less than 10% of the maximum operating power of the light sources 122. If the intensity of light impinging upon the work surface changes, the control logic will change the amount of power supplied to the light sources 122, so as to maintain the relationship between the aforementioned variables, i.e. that the total of the light emitted by the light sources and the intensity of light impinging upon the work surface is approximately equal to the desired intensity of light to be provided at the work surface. In this way, the lamp continuously provides the amount of light required by the user in view of the light conditions at the work surface.

Figure 13:
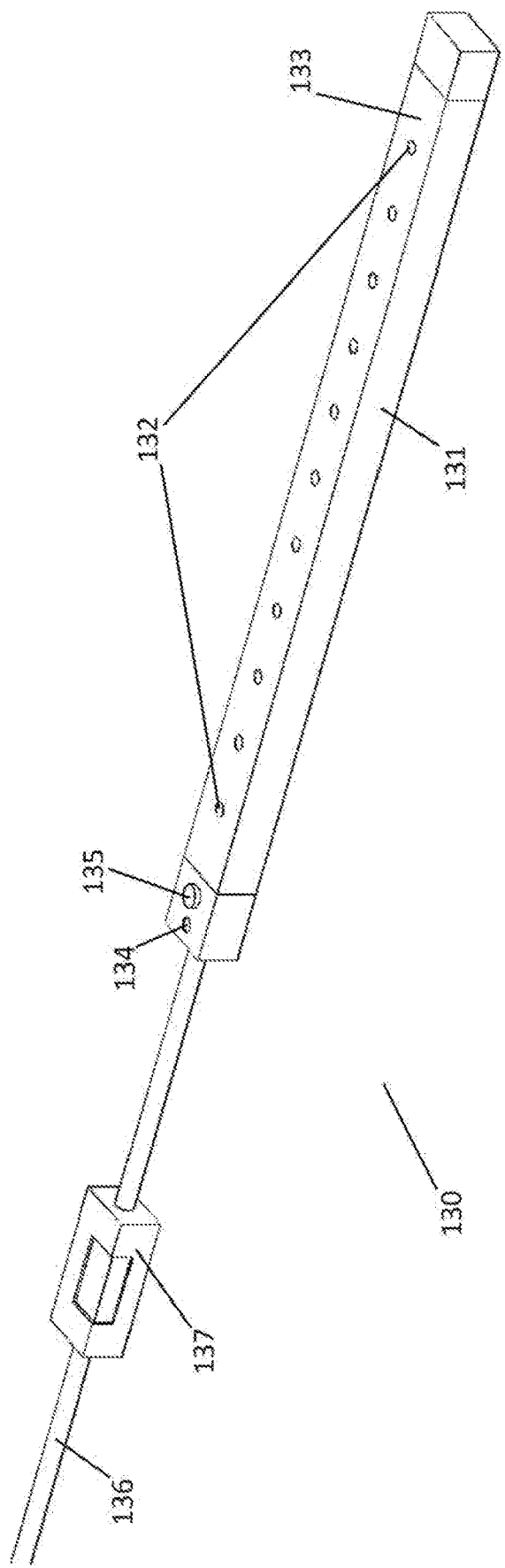
FIG. 13 is a perspective view of a sixth embodiment of a task light, showing an additional occupancy sensor added to the task light.

FIG. 13 depicts a sixth embodiment of the task light 130. As with the previous embodiment, task light 130 is generally comprised of housing 131, light sources 132, and light directing member 133. As shown in FIG. 13, task light 130 has an aperture 134 and a light intensity selector button 135 disposed on the housing 131. The task light 130 used in this sixth embodiment may be constructed in the same manner as the fifth embodiment of the task light. Housing 131 may be adapted for under-cabinet mounting of task light 130. Also shown in FIG. 13 is occupancy sensor 137 which is in electrical connection with power supply cord 136. Occupancy sensor 137 is adapted to detect the presence of a person in the area adjacent to the task light and to turn the task light off when a person is not present in the area adjacent to the task light. One of ordinary skill in the art will readily appreciate that any occupancy sensor switch suitable for use in the area around a task lamp would be suitable for use as occupancy sensor 137. Occupancy sensor 137 may operate by detecting infrared radiation in the area surrounding the task light that is produced by the presence of a person. In operation, when occupancy sensor 137 detects the presence of a person in the area surrounding the task light, it allows the flow of electrical power to task lamp 130. If the occupancy sensor does not detect the presence of a person in the area surrounding the task light, it interrupts the flow of electrical power to the task lamp 130. Occupancy sensor 137 is shown as a separate component in FIG. 13, however, one of ordinary skill in the art will readily appreciate that occupancy sensor 137 could be resident in housing 131, as long as it is arranged in such a way to allow for the detecting of a person in the area surrounding the task light.

It will be appreciated by those of ordinary skill in the art that, while the forgoing disclosure has been set forth in connection with particular embodiments and examples, the disclosure is not intended to be necessarily so limited, and that numerous other embodiments, examples, uses, modifications and departures from the embodiments, examples and uses described herein are intended to be encompassed by the claims attached hereto. Various features of the disclosure are set forth in the following claims.

I claim:

1. An LED task light comprising:
a plurality of light emitting diodes (LEDs) mounted on at least one substrate providing a variable intensity of emitted light;
a housing for receiving the at least one substrate, said housing having an arm engagement member, said arm engagement member having a pair of circular bearing surfaces with a bore therethrough for receiving a connection to an arm, a 90° bend and a shaft overlying a collar, said shaft being received within the housing;
a light guide board retained in the housing, wherein the plurality of LEDs are placed in contact with a major edge of the light guide board and a corresponding opposite edge of the light guide board;
a power supply providing a supply of electrical power to the LEDs;
a light intensity selector which allows a user to input a desired intensity of light to be provided at the work surface;
an ambient light sensor which determine an intensity of ambient light in the area surrounding the work surface; and
a control logic, electrically connected to the power supply, the light intensity elector, the ambient light sensor, and the plurality of LEDs and wherein the control logic compares the intensity of ambient light in the area surrounding the work surface with the desired intensity of light to be provided at the work surface and adjusts the supply of electrical power to the LEDs so that the total of the variable intensity of emitted light and the intensity of ambient light in the area surrounding the work surface is equal to the desired intensity of light to be provided at the work surface.

2. The LED task light of claim 1, wherein the housing is formed from a thermally conductive material and is adapted to dissipate heat generated by the plurality of LEDs.

3. The LED task light of claim 1, wherein the task light further comprises an indicator adapted to indicate to a user that the task light is operating.

4. The LED task light of claim 1, wherein the task light further comprises a an occupancy sensor adapted to detect the presence of a person in the area adjacent to the task light and to turn the light off when a person is not present in the area adjacent to the task light.

5. The LED task light of claim 1, wherein the housing is adapted for under-cabinet mounting.

6. The LED task light of claim 1, further comprising: an adjustable arm, having a first end and a second end and wherein the first end is attached to the housing; and a mounting member, connected to the second end of the adjustable arm.

7. The LED task light of claim 6, wherein the mounting member is selected from the group consisting of a C-clamp, a through-bolt mount, and an adjustable slatwall bracket.

8. The LED task light of claim 6, wherein the mounting member is a base.

9. The LED task light of claim 8, wherein the base further comprises at least one electrical outlet.

* * * * *